A. F. GROVE.
Cultivator.

No. 59,592.

Patented Nov. 13, 1866.

UNITED STATES PATENT OFFICE.

A. F. GROVE, OF JAMES CREEK, PENNSYLVANIA.

IMPROVEMENT IN CULTIVATORS.

Specification forming part of Letters Patent No. 59,592, dated November 13, 1866.

*To all whom it may concern:*

Be it known that I, A. F. GROVE, of James Creek, in the county of Huntingdon and State of Pennsylvania, have invented a new and Improved Double-Shovel Cultivator; and I do hereby declare that the following is a full, clear, and exact description thereof, which will enable others skilled in the art to make and use the same, reference being had to the accompanying drawings, forming a part of this specification, in which—

Figure 1:
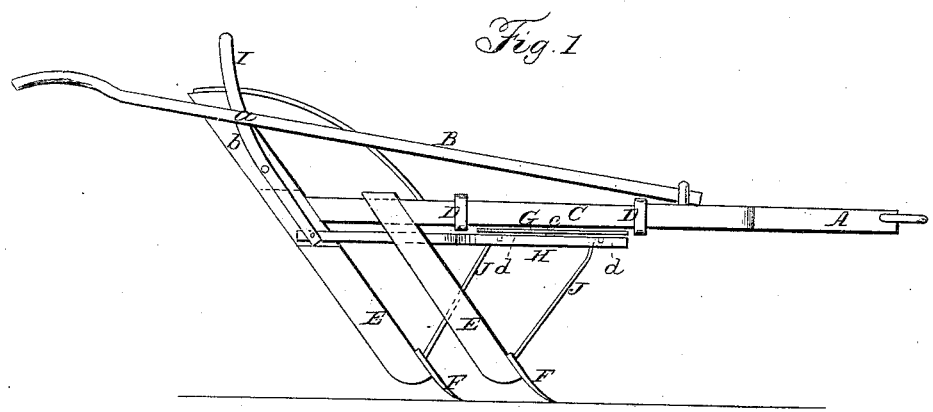
Figure 2:
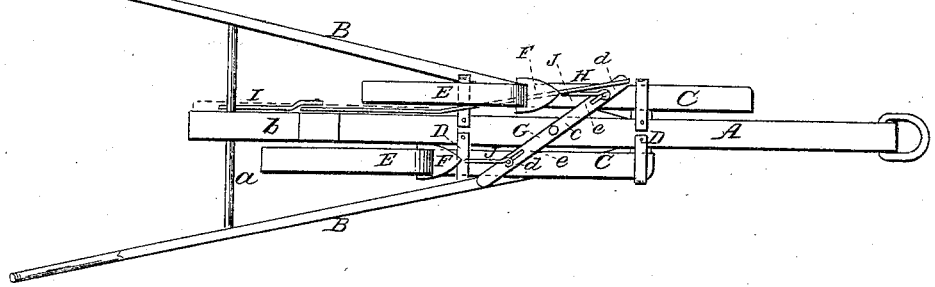

Figure 1 is a side view of my invention. Fig. 2 is an inverted plan of the same.

Similar letters of reference indicate like parts.

This invention consists in attaching the plow or shovel beams to the main beam of the implement in such a manner that the plow or shovel beams may be moved longitudinally and the two plows or shovels reversed in position, so that either plow or shovel may be placed foremost, as occasion may require, and the implement thereby rendered capable of working back or returning in the same furrow with the foremost plow or shovel in both cases nearest the row of plants.

A represents the main beam of the implement, to which the draft-animal is attached, and B B are the handles, the front ends of which are attached to the beam A. These handles are connected near their rear ends by a cross-rod, $a$, which passes through an inclined standard, $b$, at the rear end of the main beam A.

C C are the sliding plow or shovel beams, which are fitted in guides D D, a beam, C, being at each side of the beam A. These beams are allowed to work freely in the guides D D, and a standard, E, is attached to the rear end of each beam C, plows or shovels F being secured to the lower ends of the standards.

G is a lever, which is attached to the under side of the main beam A by a central pivot, $c$, and one end of this lever G is connected by a rod, H, with the lower end of an upright lever, I, the fulcrum-pin of which passes into the inclined standard $b$.

J J are brace-rods which connect the lower ends of the standards E with the beams C C. the bolts $d$, which connect the upper ends of said brace-rods with the beams C C, passing through oblong slots $e\ e$ in the lever G, as shown clearly in Fig. 2.

From the above description it will be seen that by actuating the lever I the beams C C may be moved forward and backward in the guides D D, and either plow or shovel F adjusted so as to be the foremost one, as may be desired. Hence it will be seen that the cultivator can return in the same furrow made by it at a previous "bout," and the foremost plow or shovel in both cases kept nearest the row of plants operated upon.

Having thus described my invention, I claim as new and desire to secure by Letters Patent—

The sliding or adjustable plow or shovel beams C C, applied to the main beam A of the implement, and arranged in connection with suitable levers, or their equivalents, to operate substantially as and for the purpose set forth.

A. F. GROVE.

Witnesses:
DANIEL H. GROVE,
J. H. WINTRODE.